United States Patent Office 2,905,618
Patented Sept. 22, 1959

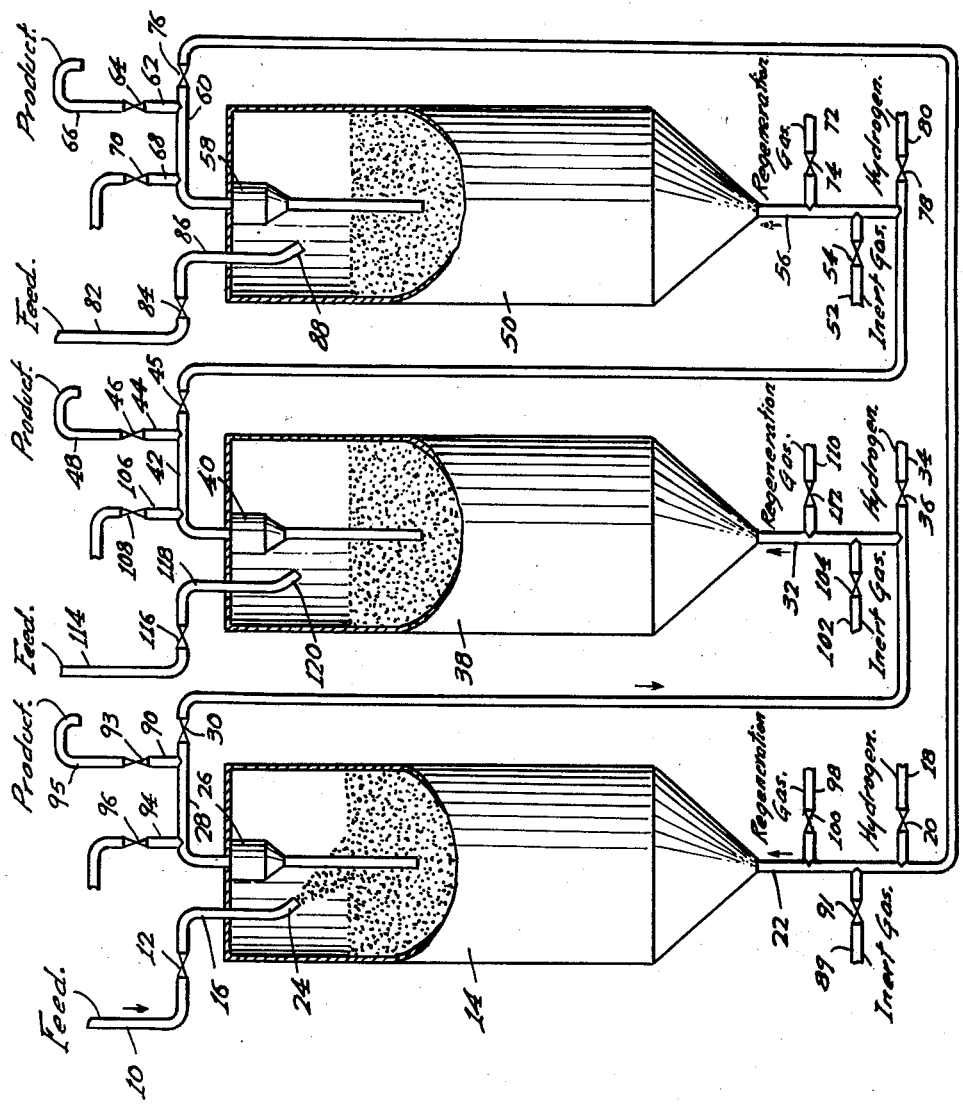

2,905,618

FLUID CATALYTIC HYDROCRACKING OF HIGH BOILING HYDROCARBON OILS IN SEVERAL STAGES

Joseph B. McKinley, Pittsburgh, and Alfred M. Henke, Springdale, Pa., assignors to Gulf Research & Development Company, Pittsburgh, Pa., a corporation of Delaware Application April 4, 1952, Serial No. 280,471

4 Claims. (Cl. 208—59)

This invention relates to a fluid catalytic process. More particularly, the invention relates to a process in which a high-boiling hydrocarbon oil is contacted with a fluidized mass of a solid catalyst.

In conventional fluid catalytic operations in which a high-boiling hydrocarbon feed is contacted with finely divided catalyst, the feed, containing both liquid and vaporous components at the conditions present in the fluid reactor, is introduced either into a transfer line carrying fluid catalyst to the bottom of the reactor or into the bottom of the reactor itself. In cases where a heavy hydrocarbon feed is introduced at least partly in liquid phase into the bottom of a bed of fluidized catalyst, care must be exercised to avoid introducing the feed at so high a rate as to cause over-wetting of the catalyst particles which may cause clumping or agglomeration of the particles and loss of fluidization. For example, in some types of operation it is desirable in order to assure avoidance of catalyst clumping to vary the maximum allowable rate of introduction of feed with the average molecular weight of the components of the feed. Thus, where an extremely heavy stock is being charged, it is frequently the case that a relatively low charging rate is desirable in order to be on the safe side with respect to catalyst clumping.

The present invention is concerned with a process in which heavy hydrocarbon feeds are converted to conversion products which leave the reactor in vapor form. In this type of process a portion of the feed may be converted to coke which is deposited on the catalyst. The invention is particularly concerned with a process of this general type in which a heavy hydrocarbon feed is introduced as a spray into the dilute upper phase of a fluidized bed of catalyst maintained at an elevated conversion temperature. We have found that this is an efficient method of introducing heavy feeds in most cases and avoids many of the disadvantages of introducing the feed into the bottom of a fluidized bed of catalyst. We have discovered, however, that this method of introducing the feed can be employed with success only when charging a certain class of heavy hydrocarbon feed stocks. For example, when charging some heavy feeds, the uniformity of the fluid catalyst bed appears to be disrupted and portions of the feed which are liquid under the conditions existing in the reactor nevertheless leave the reactor with the vaporous reaction products and portions of the feed which are in the vapor phase under the conditions existing in the reactor. It is obvious that such liquid portions are being introduced and removed from the reactor without adequate conversion.

The present invention is based in part upon the discovery that those heavy feeds with which trouble is encountered on being sprayed into the dilute upper phase of a fluidized catalyst bed contain a relatively large percentage of components which are in vapor form under the reaction conditions, and which vaporize from the feed as it is being charged to the dense phase fluid bed. Thus, it appears that the uniformity of the catalyst bed in the region of the introduction of the feed is disrupted, resulting in the uneven impregnation of catalyst particles with liquid feed, and a part of the feed which is liquid under the reaction conditions may be atomized excessively and carried upwardly in the reactor without adequate conversion. The present invention provides a process whereby heavy hydrocarbon feeds can be sprayed into the dilute upper phase of a fluidized catalyst bed in a conversion reaction zone while at the same time accomplishing adequate conversion not only of the liquid portion of the feed but also of the minor portion of the feed which is in vapor form at the conditions present in the reactor. In a preferred embodiment of our invention, the feed is not preheated to reaction temperature. This avoids the tendency to form coke during such preheating.

Charge stocks which are suitable for use as feeds in the process of the invention are high-boiling normally liquid hydrocarbons such as heavy gas oil, heavy coal tar oil, heavy shale oil, or a reduced or other crude oil fraction. These charge stocks partially vaporize under the conditions present in the reactor, but this vaporizations is limited to an amount corresponding to not more than about 25 volume percent of the feed, and preferably not more than about 15 volume percent of the feed. Thus, at least 75 to 85 volume percent of the feed remains in liquid phase as the feed is sprayed onto the top of the bed. In cases where the charge stock is one in which more than about 25 volume percent is vaporized under the conditions present in the reactor, the charge stock may still be utilized as a feed provided that a sufficient amount of the volatile constituents is removed prior to charging the feed to the fluid catalytic reactor so that the feed but partially vaporizes under the conditions present in the reactor to an extent not greater than about 25 volume percent. The removed volatile hydrocarbons can be utilized in other processes, such as the various conventional conversion processes employed in the petroleum art.

On spraying a feed having these characteristics into the dilute upper phase of a first fluidized bed of catalyst, we have found that the uniformity of the catalyst bed is not seriously disrupted and very little, if any, of the feed hydrocarbons in liquid phase under the reaction conditions leave the reaction zone without adequate conversion. In the process of the invention, the vaporous hydrocarbons in combination with the vaporous reaction products from the first fluidized bed of catalyst and if desired in admixture also with another gas or other gases, are utilized to fluidize a second bed of finely divided catalyst particles under catalytic conversion conditions which result in subjecting the vaporous hydrocarbons to catalytic conversion. Some advantage is usually obtained in subjecting the vaporous conversion products initially formed to additional conversion.

The second bed of fluidized catalyst particles can be maintained under the identical catalytic conversion conditions as the first fluid bed. In some cases, depending upon the type of product desired, the second fluid bed can be maintained under more severe, and in other cases under less severe catalytic conversion conditions than those present in the first fluid bed. For example, where it is desired to effect more severe catalytic conversion conditions in the second fluid bed, a higher temperature can be employed, or a catalyst having a higher catalytic activity than the catalyst in the first fluid bed can be used. Alternatively, if it is desired to have less severe catalytic conversion conditions in the second fluid bed, a lower temperature or a catalyst having a lower catalytic activity than that of the first fluid bed can be employed in the second fluid bed.

The process of our invention can be applied to reactions employing high-boiling liquid hydrocarbon feeds containing both liquid and vaporous components at the conditions present in the fluid reactor. By way of example, such reactions include exothermic reactions such as hydrocracking, hydrodesulfurization, and the like; and endothermic reactions such as catalytic cracking.

For the purposes of illustration we shall describe the process of our invention as applied to the hydrocracking of a feed comprising high-boiling liquid hydrocarbon constituents. However, as heretofore indicated, it is to be understood that the process of our invention is equally applicable to other processes, and accordingly the following description is to be regarded solely as an example.

Reference should be had to the accompanying drawing which is hereby incorporated into our application and made a part thereof. The single figure of the drawing discloses a system for hydrocracking a high-boiling liquid hydrocarbon. Any high-boiling liquid petroleum hydrocarbon such as a reduced crude, topped crude, or a high-boiling petroleum fraction, high-boiling coal tar oil fraction, or high-boiling shale oil fraction, etc., of which at most 25 volume percent vaporizes under the conditions present in the reactor, can be introduced into the system by means of line 10. However, the description of the operation of the system will be given in connection with the use of a reduced West Texas crude as the feed. This feed has an initial boiling point of 550° F. and when fractionally distilled yields the following volume percentage fractions:

| Volume percentage distilled | Distillation temperature, ° F. |
| --- | --- |
| 10 | 600 |
| 20 | 650 |
| 30 | 700 |
| 40 | 750 |
| 50 | 800 |
| 60 | 850 |
| 70 | 950 |
| 80 | 1,020 |
| 90 | 1,200 |

The entire system can be pressurized under controlled conditions to a pressure of about 250 to 2000 pounds per square inch or more. From line 10, the feed, which has been preheated to a temperature of about 700° to 750° F. (by means not shown) passes through valve 12 and enters fluid reactor 14 through line 16. Within fluid reactor 14 a dense phase fixed bed of fluid hydrogenation catalyst is maintained fluidized through the addition of a hydrogen-containing fluidizing gas from line 18, valve 20 and line 22.

The hydrogenation catalyst can comprise any of the conventional hydrogenation catalysts such as a group Va, group VIa, or group VIII metal or metal compound, or a mixture of group VIa and group VIII metals or metal compounds. Examples of such catalysts include: vanadium oxide, nickel, nickel oxide, tungsten, tungsten oxide, nickel tungstate, cobalt molybdate, molybdenum oxide, tungsten sulfide, etc. The hydrogenation catalyst is preferably supported upon a carrier which can comprise either an active or inert material. Examples of suitable carriers include silica-alumina, alumina, various active clays such as acid-treated montmorillonite clays, etc.

The selection of any specific hydrogenation catalyst for any specific feed or operating condition is within the skill of one skilled in the art, and does not constitute a part of our invention. In the instant example in which the feed constitutes a reduced West Texas crude, a hydrocracking catalyst comprising nickel tungstate on alumina is advantageously employed. While, as heretofore indicated, a wide range of pressures such as 250 to 2000 pounds per square inch or more can be employed, in the instant case we prefer to use a pressure of 500 pounds per square inch in reactor 14. Moreover, a broad range of temperatures can also be used as for example, a temperature within the range of 750° to 950° F. In the instant example, we prefer to employ a temperature of from 800° to 850° F. in fluid reactor 14.

The feed in line 16 is discharged into the dilute phase above the dense phase fluid catalyst bed in fluid reactor 14 through nozzle 24 located at the terminal end of line 16. Nozzle 24 is situated at a fixed height in the dilute phase above the top of the dense phase fluid catalyst bed in fluid reactor 14. The size of the droplets discharged from nozzle 24 should be large enough to prevent free transport of the droplets upwardly in the fluid reactor with the fluidizing gas. However, the feed droplet size should be sufficiently small so as not to lead to the formation of large clumps of wetted catalyst which drop to the bottom of the reactor. A feed droplet size of about 1/32 to 1/8 inch diameter is usually adequate, with a size range of about 1/8 to 1/16 inch diameter being preferred. While usually the feed is sprayed into the dilute phase as droplets, thin streams of feed can be directed at the fluid bed by means of some suitable device substituted for nozzle 24. Streams sufficiently small in diameter yield only small wetted agglomerates of catalyst on striking the fluid bed which agglomerates are rapidly and easily dispersed and broken up in the fluidized bed. The light components of the feed are vaporized both prior to and during the contact of the droplets with the fluidized catalyst particles. This vaporized material should constitute a significant portion of the feed but should not exceed 15 to 25 percent by volume, since a larger quantity of such vaporous material causes excessive turbulence in the upper portion of fluid reactor 14. The vaporous material leaves fluid reactor 14 through cyclone separator 26 which returns entrained catalyst particles to the dense phase fluid catalyst bed within fluid reactor 14. From cyclone separator 26 the vaporous material passes through line 28, valve 30, into line 32.

The liquid feed droplets contact the hydrogenation catalyst particles of the dense phase fluid bed in fluid reactor 14 under the hydrocracking conditions heretofore mentioned and are thereby converted into valuable hydrocracked products. These hydrocracked products, which may be liquids at normal room temperature, are in the vapor state at the conditions present in fluid reactor 14. As such, they pass upwardly in conjunction with the hydrogen-containinig fluidizing gas and leave fluid reactor 14 through cyclone separator 26 to form a mixture with the vaporous material in line 28, valve 30, and line 32.

The mixture in line 32 may be supplemented by the addition of further amounts of hydrogen-containing gas from line 34 and valve 36, although in many cases, this will not be necessary. From line 32 the mixture enters fluid reactor 38 and serves to maintain a fixed dense phase fluid bed of hydrogenation catalyst in fluid reactor 38. In the instant case, the hydrogenation catalyst within fluid reactor 38 is the same type of catalyst utilized in fluid reactor 14. In certain cases, it may be advantageous to substitute a different form of hydrogenation catalyst in the second fluid reactor (in the instant case fluid reactor 38) than that employed in the first fluid reactor (in the instant case fluid reactor 14). However, as we shall more fully explain later, our process can be operated in such a manner that although the catalyst in both fluid reactors is of the same type, the catalyst in the second reactor can either possess a greater or lesser catalytic activity than the catalyst in the first reactor. Moreover, while the temperature conditions within the second fluid reactor can be identical to those employed in the first fluid reactor, it is sometimes advantageous to employ a different temperature within the range of 750° to 950° F. in the second fluid reactor, especially when the catalyst is identical to that in the first fluid reactor and possesses the same order of catalytic activity.

The gas mixture introduced through line 32 while maintaining the dense phase fluid bed within reactor 38 is also catalytically hydrocracked to form valuable hydrocracked products such as gasoline. These valuable hydrocracked products and any unreacted hydrogen-containing gas from fluid reactor 38 are removed through cyclone separator 40 which returns entrained catalyst to the fluid bed within fluid reactor 38. The products are removed through lines 42 and 44, valve 46, and line 48 to a product accumulator (not shown).

A major advantage of the system shown in the accompanying figure is that it is continuous. Thus, two of the three reactors shown in the figure can be on-stream at any given time, while simultaneously the catalyst in the third reactor undergoes regeneration. Regeneration of the catalyst in the third reactor is usually necessary as there is a build-up of carbonaceous contaminants upon the catalyst while it is on-stream which results in a concomitant decrease in the catalyst's activity. In some cases, such as certain hydrogenation processes in which greatly elevated pressures are employed, regeneration of the catalyst is not necessary as there is no significant build-up of carbonaceous contaminants upon the catalyst. Accordingly, the third reactor in which the catalyst undergoes regeneration can be eliminated. After prolonged on-stream periods, the catalyst inventory in these processes is usually replaced due to a gradual deactivation of the catalyst. It is to be understood that the process of our invention can be employed for these cases.

For the purpose of illustration we have disclosed fluid reactors 14 and 38 as being on-stream in which case the catalyst in fluid reactor 50, which is of the same type as that in fluid reactors 14 and 38, is being regenerated. To effect this regeneration, fluid reactor 50 is isolated from fluid reactor 38 by closing valve 45, and any entrained hydrocarbons and hydrogen-containing gas are removed from the fluid catalyst bed in fluid reactor 50 through purging with an inert gas such as flue gas from line 52, valve 54 and line 56. The purging gases are passed through cyclone separator 58, which returns entrained catalyst to the fluid catalyst bed in fluid reactor 50, and then passed through lines 60 and 68, and valve 70. Means (not shown) are provided to condense out and retain the hydrocarbons from line 68.

At the conclusion of the inert gas purge, valve 54 is closed and regeneration gas, such as an oxygen-containing gas like air plus flue gas, is introduced through line 72, valve 74, and line 56 into fluid reactor 50. The carbonaceous contaminants on the catalyst particles within fluid reactor 50 are removed by oxidative combustion. The oxidative combustion is effected under conventional regeneration conditions such as a temperature of the order of 1000° to 1200° F. The pressure can be identical to that employed in the on-stream fluid reactors, or if desired suitable pressure regulating equipment may be added, and the regeneration conducted at relatively low pressures such as of the order of one to five atmospheres.

The flue gases from the oxidative regeneration are removed from fluid reactor 50 through cyclone separator 58 and line 60. From line 60, the flue gases are removed from the system through line 68 and valve 70.

After the bed of catalyst within fluid reactor 50 has been regenerated to substantially its original activity, and after the activity of the fluid catalyst bed in fluid reactor 38 has declined to a point where its regeneration is desirable, valves 30, 12 and 36 are closed. Prior to this time, the catalyst bed in fluid reactor 50 is purged of regeneration gas by inert gas from line 52, valve 54 and line 56. This regeneration gas is removed from fluid reactor 50 through cyclone separator 58, lines 60 and 68, and valve 70. At the conclusion of the purge valve 70 is closed, and valve 78 is opened. Hydrogen-containing fluidizing gas is introduced into the catalyst bed in fluid reactor 50 through line 80, valve 78 and line 56. This hydrogen-containing gas maintains the catalyst particles within fluid reactor 50 in a fluidized condition as a dense phase fluid bed. Similar reaction conditions, such as temperature, heretofore mentioned as being present in the first reactor, are established within fluid reactor 50. Preheated feed is then introduced into the system through line 82, valve 84, line 86, and nozzle 88, and valve 76 is opened. From nozzle 88, the feed is discharged as droplets into the dilute phase above the dense phase fluid catalyst bed within fluid reactor 50. A portion of the feed is vaporized due to the conditions present in fluid reactor 50. This vaporized feed passes out of fluid reactor 50 through cyclone separator 58 and line 60. The remainder of the feed in the form of feed droplets contacts catalyst particles in fluid reactor 50 and is converted into valuable hydrocracked products. These hydrocracked products, which may be liquids at room temperature, are in the vapor state at the conditions present in fluid reactor 50. The vaporized hydrocracked products pass upwardly in conjunction with hydrogen-containing fluidizing gas and leave fluid reactor 50 through cyclone separator 58 to form a mixture with the vaporized material in line 60. Cyclone separator 58 returns entrained catalyst to the fluid catalyst bed within fluid reactor 50.

The mixture in line 60 passes through valve 76 into line 22. The mixture may be supplemented by the addition of further amounts of hydrogen-containing gas from line 18 and valve 20, although in many cases this will not be necessary. From line 22, the mixture enters fluid reactor 14 and serves to maintain a fixed dense phase fluid bed of hydrogenation catalyst in fluid reactor 14. The reaction conditions now present in fluid reactor 14 correspond to those heretofore set forth for the second fluid reactor. At least a portion of the hydrocarbon constituents of the mixture is hydrocracked in fluid reactor 14 to form valuable hydrocracked products, such as gasoline. These valuable hydrocracked products and any unreacted hydrogen-containing gas from fluid reactor 14 are removed through cyclone separator 26, which returns entrained catalyst to the fluid bed within fluid reactor 14, following which these products are removed through lines 28 and 90, valve 93 and line 95 to a product accumulator (not shown).

After fluid reactors 50 and 14 have been on-stream for the desired length of time, and the activity of the catalyst has declined, valves 76, 78, 84 and 20, if open, are closed. The fluid catalyst bed within fluid reactor 14 is purged of hydrocarbons and hydrogen-containing gas by introducing an inert gas such as flue gas from line 89, valve 91, and line 22. The purging gases are passed through cyclone separator 26, which returns entrained catalyst to the fluid catalyst bed in fluid reactor 14, and then removed from the system through lines 28 and 94, and valve 96. Means (not shown) are provided to condense out and retain the hydrocarbons from line 94.

When the fluid catalyst bed within fluid reactor 14 has been purged, it is regenerated by oxygen-containing regeneration gas, such as air, plus flue gas from line 98, valve 100, and line 22, and the carbonaceous contaminants removed by oxidative combustion. The regeneration is accomplished under identical conditions as those previously set forth for the regeneration of the catalyst bed in fluid reactor 50. Regeneration flue gases are removed from fluid reactor 14 through cyclone separator 26, lines 28 and 94, and valve 96. Following the regeneration of the fluid catalyst particles in fluid reactor 14, the regeneration gas is removed through purging with an inert gas from line 89, valve 91, and line 22. The purged gases are removed from the system through cyclone separator 26, lines 28 and 94, and valve 96.

While reactors 50 and 14 are on-stream, the fluid catalyst bed within fluid reactor 38 is undergoing regeneration. This is accomplished by first purging hydrocarbons and hydrogen-containing gas from fluid reactor 38 through the introduction of inert gas, such as flue gas, from line 102, valve 104 and line 32. The purged gases are removed from fluid reactor 38 through cyclone separator 40 which returns entrained catalyst to fluid reactor 38, and are then removed from the system through lines 42 and 106, and valve 108. Means (not shown) are provided to condense out and retain the hydrocarbons from line 106.

The carbonaceous contaminants on the catalyst particles within fluid reactor 38 are then removed by oxidative combustion under similar conditions to those previously set forth. This is accomplished by introducing regeneration gas through line 110, valve 112, and line 32 into fluid reactor 38. The regeneration flue gases are removed from fluid reactor 38 through cyclone separator 40, lines 42 and 106, and valve 108. Following the regeneration of the fluid catalyst particles in fluid reactor 38, the regeneration gas is removed through purging with an inert gas from line 102, valve 104 and line 32. The purging gases are removed from the system through cyclone separator 40, lines 42 and 106, and valve 108.

While fluid reactor 14 is in the regeneration stage, fluid reactors 38 and 50 are on-stream. Thus the fluid catalyst particles within fluid reactor 38 are maintained as a fixed dense phase fluidized bed through the introduction of hydrogen-containing gas from line 34, valve 36, and line 32. Similar reaction conditions such as temperature, heretofore mentioned as being present in the first reactor are established within fluid reactor 38. Preheated feed is introduced from line 114, valve 116 and line 118. From line 118 the feed is discharged as droplets into the dilute phase above the fixed dense phase fluid bed by means of nozzle 120. A portion of the discharged feed from nozzle 120 is vaporized due to the conditions present in fluid reactor 38. This vaporized feed is removed from fluid reactor 38 through cyclone separator 40 and line 42. The remainder of the feed in the form of feed droplets contacts the catalyst particles in fluid reactor 38 and is converted into valuable hydrocracked products. These hydrocracked products, which may be liquids at normal room temperature, are in the vapor state at the conditions present in fluid reactor 38. As such, they pass upwardly in conjunction with unreacted hydrogen-containing gas and leave fluid reactor 38 through cyclone separator 40 to form a mixture with the vaporized material in line 42. Cyclone separator 40 returns entrained catalyst to the fluid catalyst bed within fluid reactor 38.

The mixture in line 42 passes through valve 45 into line 56 and may be supplemented by the addition of further amounts of hydrogen-containing gas from line 80 and valve 78 although in many cases, this will not be necessary. From line 56 the mixture enters fluid reactor 50 and serves to maintain a fixed dense phase fluid bed of hydrogenation catalyst in fluid reactor 50. The mixture undergoes hydrocracking in fluid reactor 50 which is maintained under the same reaction conditions as heretofore set forth for the second fluid reactor. The hydrocracked products, such as gasoline, and any unreacted hydrogen-containing gas are removed from fluid reactor 50 through cyclone separator 58, which returns entrained catalyst to the fluid bed within fluid reactor 50, following which these products are removed through lines 60 and 62, valve 64 and line 66 from which they are passed to a product accumulator (not shown).

When operating in the manner indicated above, continuous operation can be obtained. Thus, while fluid reactors 14 and 38 are on-stream, fluid reactor 50 is in the regeneration stage; or while fluid reactors 38 and 50 are on-stream, fluid reactor 14 is in the regeneration stage; or while fluid reactors 50 and 14 are on-stream, fluid reactor 38 is in the regeneration stage. In the system shown in the accompanying drawing, when similar catalyst is employed in both on-stream reactors, the most active catalyst is located in the reactor initially contacting the feed. Accordingly, if the temperature in both reactors is identical, more severe hydrocracking is encountered in the first reactor. If desired, by simply rearranging the piping, the feed can be introduced initially to the reactor containing the less active catalyst, and then transferred to a second reactor containing more active catalyst.

While the character of the invention has been described in detail, this has been done by way of illustration only, with the intention that no limitation should be imposed upon the invention thereby. It will be apparent to those skilled in the art that numerous modifications and variations may be effected in the practice of the invention and accordingly, these modifications and variations should be construed as included within the scope of the claims appended hereto. Thus, for example, in place of the three reactor systems set forth in the accompanying figure, two reactors can be used, with the catalyst inventory of one or both of the reactors regenerated after a given on-stream period. This may be accomplished in situ, or in an external regenerator to which the catalyst has been transferred. Furthermore, more than three reactors can be utilized and different arrangements maintained for switching the reactors between on-stream and regeneration stages. It is of course to be understood that suitable automatic valve control equipment, flow regulators, pressure controllers, and other operating equipment readily apparent to one skilled in the art can be utilized.

Moreover, it is to be understood that other pressure conditions and catalysts than those heretofore mentioned can be used; such reaction conditions or catalysts as are apparent to one skilled in the art can be used in the process of our invention.

The process of our invention permits the ready processing of high-boiling feeds with fluidized catalyst. Clumping and agglomerating of the fluidized catalyst particles are avoided. In addition, relatively low-boiling components of the feed which are vaporous under the conditions present in the reactor undergo catalytic treatment.

We claim:

1. In a process wherein a high-boiling normally liquid hydrocarbon is hydrocracked in a first reaction zone maintained under hydrocracking conditions including an elevated temperature, said first reaction zone containing a bed of dense phase fluidized hydrogenation catalyst particles above which there is a dilute phase of hydrogenation catalyst particles, fluidization of said catalyst particles being maintained by a hydrogen-containing gas, the steps which comprise spraying into said dilute phase of catalyst particles a high-boiling normally liquid hydrocarbon feed which is partially vaporized to an extent of not more than about 25 volume percent of said feed under said hydrocracking conditions in said first reaction zone and thereby vaporizing said vaporizable portion of said feed, the size of said spray being sufficiently large to prevent free transport of the feed upwardly in said reaction zone and sufficiently small to prevent the formation of large clumps of wetted catalyst particles which fall to the bottom of said reaction zone, catalytically hydrocracking the non-vaporized portion of said feed in said dense phase fluidized hydrogenation catalyst bed to form hydrocracked vaporous reaction products, forming a gaseous mixture of said vaporized portion of said feed, said vaporous hydrocracked products and unreacted hydrogen-containing gas, fluidizing in a second reaction zone a dense phase bed of hydrogenation catalyst particles by means of said gaseous mixture, and catalytically hydrocracking said vaporized portion of said feed and said vaporous hydrocracked products in said second reaction zone.

2. The process of claim 1, wherein the hydrocracking conditions in said reaction zones comprise a temperature of about 750° to 950° F. and a pressure of about 250 to 2,000 pounds per square inch.

3. The process of claim 1, wherein during the course of reaction the catalyst in at least one of said reaction zones eventually loses activity because of the build-up of carbonaceous contaminants thereon, and the said deactivated catalyst is oxidatively regenerated.

4. The process of claim 3, wherein there are provided three reaction zones, in two of which said hydrocracking is taking place, and in the third reaction zone deactivated catalyst is being oxidatively regenerated.

References Cited in the file of this patent

UNITED STATES PATENTS

| | | |
|---|---|---|
| 2,378,531 | Becker | June 19, 1945 |
| 2,388,055 | Hemminger | Oct. 30, 1945 |
| 2,464,539 | Voorhies et al. | Mar. 15, 1949 |
| 2,520,146 | Houdry | Aug. 29, 1950 |
| 2,556,514 | Bergstrom | June 12, 1951 |
| 2,655,464 | Brown et al. | Oct. 13, 1953 |
| 2,655,465 | Martin | Oct. 13, 1953 |